United States Patent

[11] 3,633,201

[72] Inventor Donald L. Oesterlin
Roselle, Ill.
[21] Appl. No. 701,734
[22] Filed Jan. 30, 1968
[45] Patented Jan. 4, 1972
[73] Assignee Nuclear-Chicago Corporation
Des Plaines, Ill.

[54] DIGITAL MEASURING APPARATUS
10 Claims, 7 Drawing Figs.
[52] U.S. Cl. .................................................. 340/347
[51] Int. Cl. ....................................................... H03k 13/20
[50] Field of Search ........................................... 340/347;
324/99

[56] References Cited
UNITED STATES PATENTS
3,051,939  8/1962  Gilbert ........................ 340/347
3,316,547  4/1967  Ammann ...................... 340/347
3,368,149  2/1968  Wasserman .................. 324/99
3,462,758  8/1969  Reynal et al. ................ 340/347

Primary Examiner—Maynard R. Wilbur
Assistant Examiner—Gary R. Edwards
Attorneys—Lowell C. Bergstedt, Walter C. Ramm and Helmuth A. Wegner ABSTRACT: Digital measuring apparatus employing automatic ranging analog to digital conversion circuitry. The ADC circuity stores a voltage ramp of slope proportional to the unknown input signal during one or more ranging intervals depending upon the slope, until a voltage level proportional to the magnitude of the input signal is reached. The number of ranging intervals employed is signalled by ranging pulses which indicate the decimal range of magnitudes of the input signal and are used to produce an appropriate decimal point display. A decimal number display is generated by accumulating a number of measuring pulses as the stored voltage level is discharged at a constant rate. The number of measuring pulses is equal to the decimal number magnitude of the stored level.

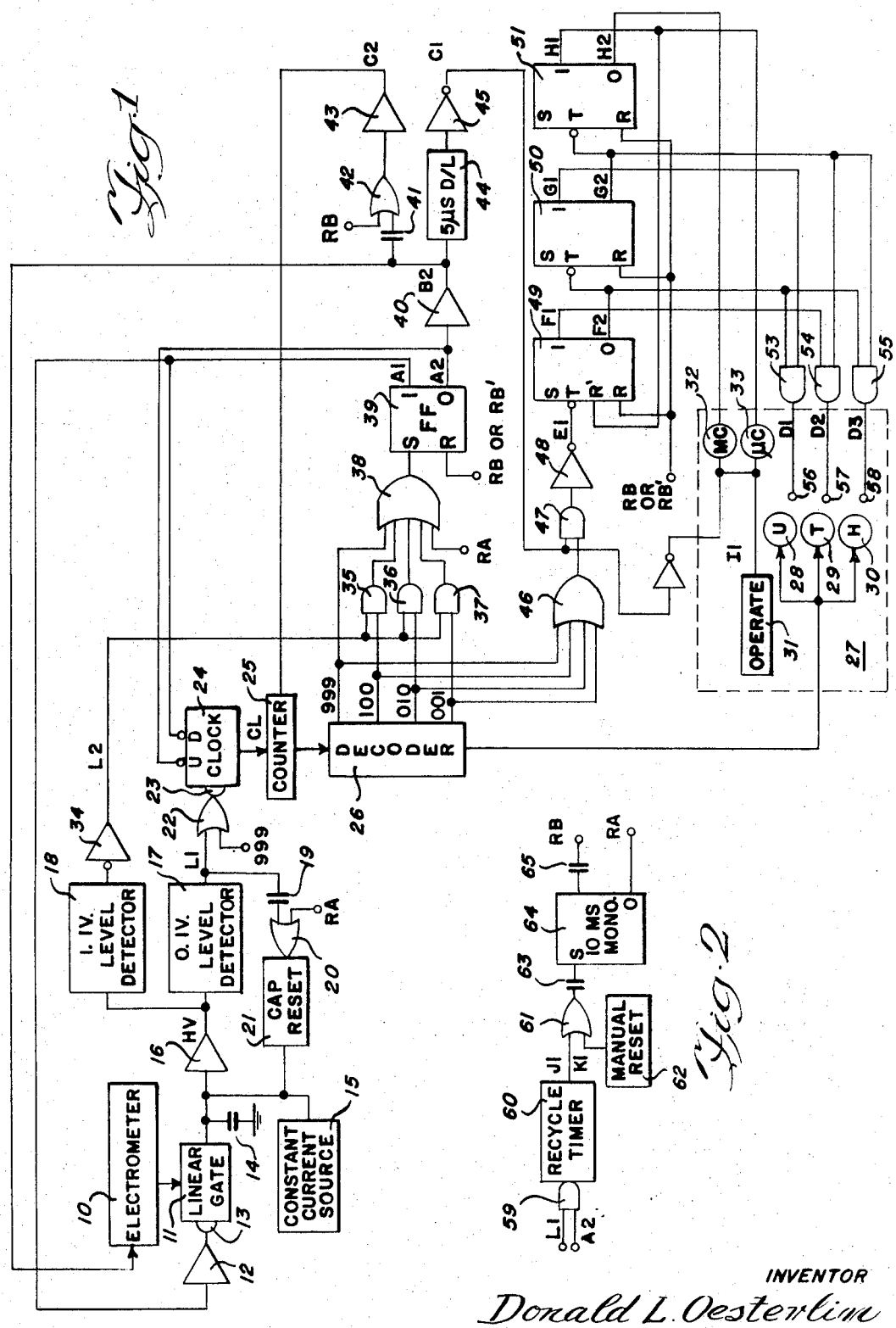

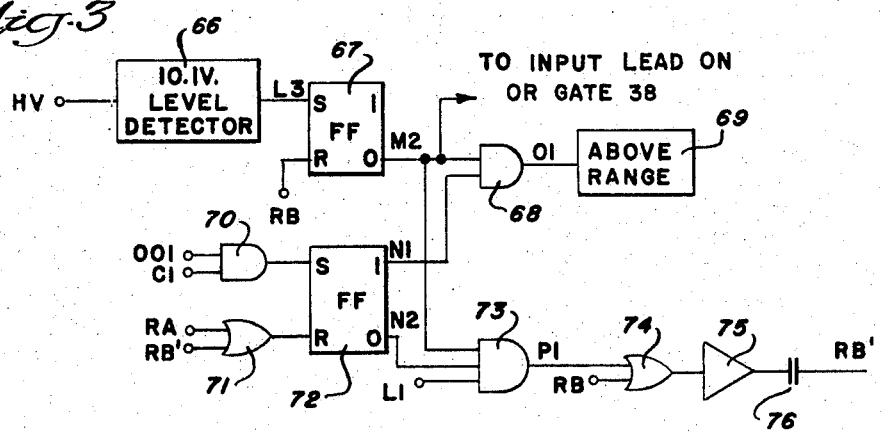
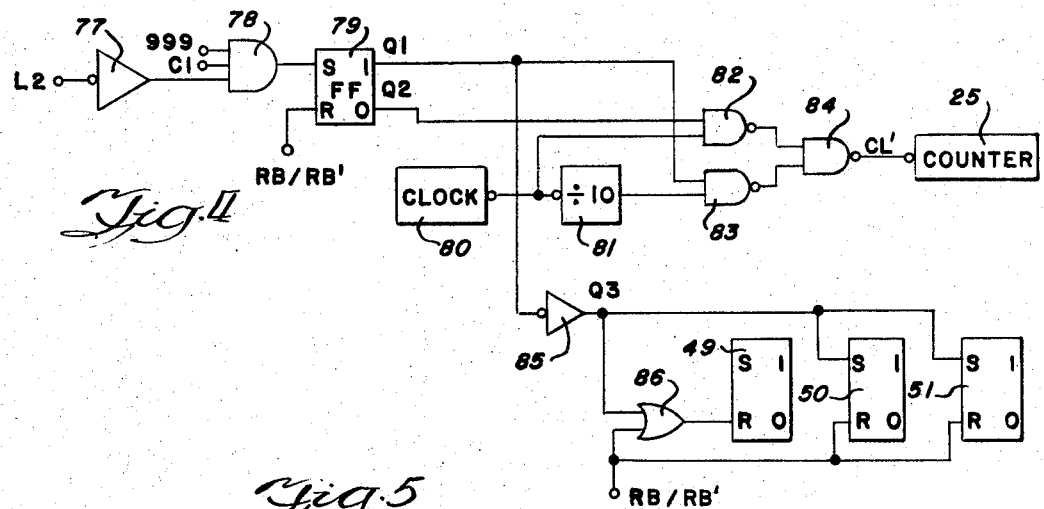
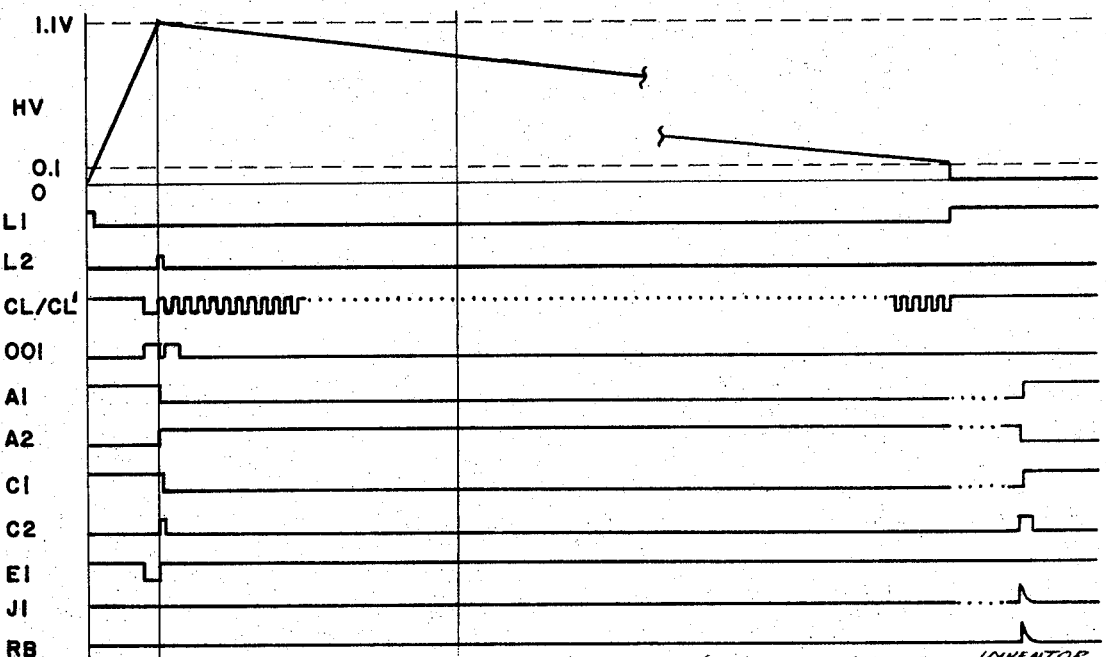

DIGITAL MEASURING APPARATUS

This invention relates, in general, to embodiments of analog-to-digital conversion apparatus which are particularly advantageously employed in radiation-measuring apparatus for accomplishing direct digital readout of radiation level in appropriately chosen units of measurement.

Radiation-measuring apparatus generally comprises a transducer which produces an output signal in response to incident radiation and readout apparatus which utilizes the output signal to develop information concerning the incident radiation. The type of transducer and readout apparatus are selected in terms of the particular information which is desired concerning the particular type of radiation involved. One of the well-known types of radiation transducers is the electrometer-ionization chamber combination which measures the change in electric potential difference between a pair of charged electrodes in the chamber resulting from ionization produced by incident radiation. The output of the electrometer is a current, the magnitude of which varies linearly with the degree of ionization in the gaseous material between the pair of electrodes. The electrometer coupled to the ionization chamber does not distinguish individual pulses caused by individual disintegrations but rather gives a readout of the ionization resulting from a large number of disintegrations produced in the vicinity of the ionization chamber. If the number of disintegrations per unit of time is substantially constant, the output of the electrometer is a substantially constant current. If the electrometer, however, is an integrating-type electrometer, the output signal becomes a voltage ramp of substantially constant slope. The slope of the voltage ramp is then functionally related to the degree of ionization produced in the ionization chamber by incident radiation.

If the ionization chamber-electrometer combination is to be used with readout apparatus to produce a reading of the radiation incident on the ionization chamber in terms of roentgens per unit of time, a direct correlation exists between the amount of ionization produced in the ionization chamber per unit of time and the magnitude of the output current from the electrometer, or the slope of the voltage ramp in the case of an integrating electrometer. The readout apparatus can be calibrated to give a reading in roentgens per unit of time, and this calibration will be used regardless of the source of the radiation incident upon the ionization chamber.

If the readout from the radiation measuring apparatus employing an ionization chamber-electrometer combination as the transducer is to be in units which are not directly related to the degree of ionization produced but are dependent upon the number of disintegrations per second in the particular radioactive material producing the radiation, the instrument must be calibrated for each type of radioactive material. For example, if the source of radiation is a radioactive isotope emitting at each disintegration a gamma ray having a particular energy, each disintegration from such an isotope will produce a greater ionization in the ionization chamber than that which is produced during each disintegration of an isotope which produces a gamma ray having a lower energy. A typical unit of measurement for radioactive isotopes is the curie, which is defined as that quantity of a particular radioactive material having associated with it $3.7 \times 10^{10}$ disintegrations per second. Therefore, if a radiation-measuring instrument is to have a readout in curies and is to be used for measurements of different types of radioactive isotopes, the instrument must be calibrated for each type of radioactive isotope individually. It would be possible to obtain a readout in roentgens per unit of time and then transform that readout into curie units by multiplying the reading by a particular conversion factor for the individual radioactive isotope being measured.

In many applications, particularly where a large number of measurements on various radioactive isotopes must be made within a short period of time, it is desirable to use a radiation-measuring instrument which can give an accurate readout in curie units for a number of different types of radioactive isotopes. Moreover, it is particularly advantageous to have available a radiation measuring instrument which gives a direct digital readout of the curie value of the particular radioactive isotope and has a wide range of measuring capability to minimize the manipulations required to perform the actual measurements.

While the apparatus of this invention is described in terms of radiation measurement apparatus, it should be understood that the particular analog-to-digital conversion apparatus employed has broader applicability in instrumentation generally.

Therefore, it is a principal object of this invention to provide radiation-measuring apparatus for producing a decimal digital readout of the measured radiation in appropriate preselected units.

It is a further object of this invention to produce radiation-measuring apparatus which automatically detects and indicates the particular range of the radiation level being measured.

It is a further object of this invention to provide radiation-measuring apparatus having a high degree of insensitivity to noise.

In accordance with this invention apparatus is provided for translating an input analog signal having a substantially constant slop of a magnitude which varies directly with the magnitude of a physical quantity being measured in accordance with a predetermined function into a decimal digital display of the measured quantity in terms of the decimal digital magnitude and the range in appropriately preselected units. Typically the input analog signal is a linear voltage ramp, and the measuring apparatus includes means for storing the input voltage ramp signal until a particular voltage level is attained and simultaneously producing ranging pulses at appropriate ranging intervals as the voltage ramp is being stored. The number of ranging pulses produced before the final level of the voltage ramp is stored is dependent upon the slope magnitude of the voltage ramp in such a way that the number of ranging pulses produced is a measure of the range in which the magnitude of the measured quantity falls and the level of the stored voltage ramp is proportional to the magnitude of the measured quantity in decimal digital units. The magnitude of the voltage ramp stored is translated into the appropriate decimal digital units by discharging the storage means for the voltage ramp at a preselected constant rate and simultaneously producing and registering a number of measuring pulses. The measuring pulses have a periodicity which is preselected so that the total number produced during the discharge of the stored voltage is appropriately proportional to the magnitude of the stored voltage, namely, in such a fashion that the total number of measuring pulses produced comprises the decimal digital equivalent of the stored voltage within the range indicated by the number of ranging pulses produced.

The ranging pulses are produced by a clock circuit, a counter and a decoder which produces output pulses when preselected numbers of clock pulses are accumulated in the counter. The same clock circuit, counter and decoder can be used for producing and accumulating the measuring pulses, with the decoder transforming the accumulated measuring pulses into an appropriate form for decimal digital display.

In a preferred embodiment of the invention, the voltage ramp signal is gated into a storage capacitor which stores the level of the voltage ramp on a continuous basis. The input gate can be inhibited by an inhibit signal at which time a constant current source connected to the storage capacitor begins to discharge the stored voltage at a constant preselected rate. A pair of voltage level detectors are coupled to the storage capacitor for monitoring the voltage level stored thereon. The first of these voltage level detectors is set at a selected threshold level above 0 volts and produces a TRUE output signal when the voltage on the storage capacitor is below the threshold of the detector and a FALSE output signal when the voltage level on the storage capacitor is at or above the threshold level. The second level detector has a threshold at a preselected higher voltage and produces corresponding output signals in terms of the voltage stored on the storage capacitor. Typically the first level detector has a threshold voltage level sufficiently greater than the 0-volts level such that it will not be changed from a TRUE to a FALSE output by noise signals existing at its input. The output of the first level detector is connected to the inhibit input of the clock circuit so that clock pulses are produced when the output is FALSE, or in other words when the voltage level stored on the storage capacitor is above the voltage threshold of the first detector. The clock circuit produces pulses which are accumulated in the counter and the decoder decodes output ranging pulses at preselected numbers of accumulated clock pulses. The ranging pulses are fed to a coincidence means which indicates the coincidence of one of the ranging pulses with a FALSE output signal from the second level detector. At this time the input linear gate is inhibited and the stored voltage on the storage capacitor is discharged while the clock circuit produces measuring pulses which are accumulated in the counter until the stored voltage level falls below the threshold voltage of the first level detector.

It will be appreciated that, by properly programming the clock circuit during the period when the input linear gate is gating the voltage ramp into the storage capacitor and by selecting appropriate numbers of accumulated clock pulses for ranging pulses in terms of the difference in threshold between the first and second level detectors, the number of such ranging pulses produced while the voltage ramp is being stored provides a measure of the range in which the particular slope of the input voltage ramp falls. It will also be appreciated that, since further storage of the voltage ramp is inhibited at the time that the appropriate one of the ranging pulses coincides with a FALSE output from the second level detector, the magnitude of the stored voltage is appropriately proportional to the magnitude of the slope of the voltage ramp for the particular range indicated by the number of ranging pulses. The translating of that stored voltage into a decimal digital display can then be accomplished by programming the clock circuit to produce measuring pulses with appropriate periodicity while the constant current source is discharging the storage capacitor.

Programming of the clock circuit and controlling of the input linear gate and the counter can be performed by a control circuit appropriately inserted into the system to produce the appropriate ranging and measuring periods, particularly in terms of the output of the coincidence means which signals the end of the ranging interval.

The features of automatic ranging and noise insensitivity are particularly advantageous since the operator of the equipment is not required to select or change ranges to produce the desired digital reading and the small noise signals inherent in all electrical systems will not trigger the first level detector and initiate a ranging period.

Other features and advantages of this invention will be apparent from a reading of the following detailed description in conjunction with the accompanying drawings in which:

FIG. 1 is a schematic diagram of a preferred embodiment of measuring apparatus in accordance with the invention;

FIG. 2 is a schematic diagram of reset and recycle apparatus which can be incorporated in the apparatus shown in FIG. 1;

FIG. 3 is a schematic diagram of optional additional features which can be incorporated into the apparatus shown in FIG. 1;

FIG. 4 is a schematic diagram of range extending apparatus which can be incorporated into the apparatus shown in FIG. 1; and, FIGS. 5, 6, and 7 are pulsing diagrams showing the operation of the apparatus shown in FIGS. 1 through 4.

Figure 6:
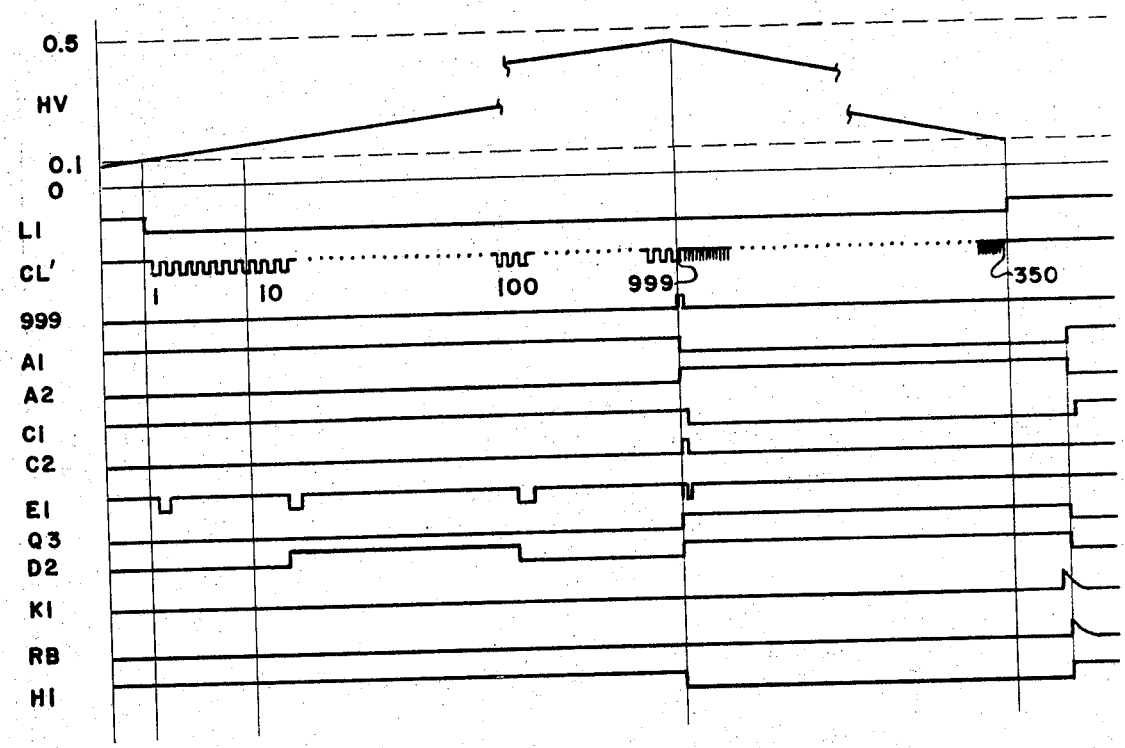

With reference to FIG. 1, an electrometer 10 is shown with its output coupled through linear gate 11 into a storage capacitor 14. Electrometer 10 is a resettable, integrating electrometer which, in a physical system, may be connected to an ionization chamber such that, under a steady radiation field, the output of the integrating electrometer will be a linear voltage ramp having a slope magnitude which is a predetermined function of the incident radiation in selected units such as roentgens per minute or curies. It should be understood, however, that the input signal to linear gate 11 may be any linear voltage ramp which has a slope magnitude which is related to a measured physical quantity by a predetermined function.

Electrometer 10 has a reset input B2 which is taken from the A2 output of flip-flop 39. Linear gate 11 has an inhibit input 13 which is coupled by way of a buffer amplifier 12 to lead A1 at the output of flip-flop 39. Consequently, when flip-flop 39 is in its RESET state, a TRUE signal on output lead A1 permits linear gate 11 to gate the signal from electrometer 10 into storage capacitor 14. When flip-flop 39 is in a SET state, the signal on output signal A1 becomes FALSE, and linear gate 11 is inhibited. At the same time, output lead A2 from flip-flop 39 becomes TRUE and electrometer 10 is reset.

Constant current source 15 is coupled to storage capacitor 14 and operates when linear gate 11 is inhibited to discharge storage capacitor 14 at a preselected constant rate.

Level detectors 17 and 18 are coupled to storage capacitor 14 by way of a buffer amplifier 16. The threshold of level detector 17 is set at 0.1 volts so that the output L1 of level detector 17 is TRUE when the input signal HV from storage capacitor 14 is below 0.1 volts and becomes FALSE when the input signal HV is at or above 0.1 volts. Correspondingly, level detector 18 is set at a 1.1-volt threshold so that its output L2 through inhibit amplifier 34 is FALSE when input signal HV is below 1.1 volts and is TRUE when input signal HV is at or above 1.1 volts.

Output L1 from level detector 17 is coupled through capacitor 19 to OR-input 20 of capacitor reset circuit 21. The output of capacitor reset circuit 21 is coupled to storage capacitor 14. Another input to OR-input 20 is a reset input RA. Consequently, when output L1 from level detector 17 changes from FALSE to TRUE or when reset lead RA has a TRUE signal thereon, capacitor reset circuit 21 will operate to reset the voltage on storage capacitor 14 to a voltage slightly below ground potential, typically on the order of −0.4 volts.

Output L1 from level detector 17 is also fed through an OR-input 22 to inhibit input 23 of clock circuit 24. OR-input 22 also has a second input lead 999. When the signal on either lead L1 or lead 999 is TRUE, clock circuit 24 is inhibited and produces no clock pulses. However, when both L1 and 999 are false, clock circuit 24 produces clock pulses on output CL. The periodicity of clock pulses CL produced by clock circuit 24 is controlled by U- and D-inhibit inputs from lead A2 and lead A1 of flip-flop 39, respectively. Consequently, when A1 is TRUE and A2 is FALSE, clock circuit 24 is in a U-mode (up or ranging) and clock pulses of a first periodicity are produced. Conversely, when flip-flop 39 is in a SET state with A2 TRUE and A1 FALSE, clock circuit 24 is in a D-mode (down or measuring) and clock pulses on lead CL will have a second periodicity. The periodicity of clock pulses in either or both the U- and D-modes may be variable to provide for selection of periodicities in each mode as required. Selection of periodicity in the U-mode is particularly desirable where different radioisotopes are being measured in curie units.

Output CL from clock circuit 24 is coupled to a counter 25 which may be a binary counter divided into separate decades. Counter 25 has a reset input lead C2. The signal on lead C2 is obtained from the A2 output of flip-flop 39 by way of buffer amplifier 40, capacitor 41, OR-gate 42, and buffer amplifier 43. A second input to gate 42 is reset lead RB. Consequently, a reset pulse will be sent to counter 25 over lead C2 when flip-flop 39 changes from a RESET to a SET state so that A2 and B2 change from FALSE to TRUE. Counter 25 is also reset when a TRUE signal exists on reset lead RB.

The output of counter 25 is coupled to decoder circuit 26. Decoder 26 has an output to units (U), tens (T), and hundreds (H) display 28, 29, and 30 and also four separate output leads labeled 001, 010, 100, and 999. Counter 25 accumulates clock pulses from clock circuit 24 until it is reset by a positive reset signal on lead C2. The accumulated clock pulses in counter 25 are decoded by decoder circuit 26 and displayed at units, tens and hundreds displays 28, 29, and 30. The signal on lead 001 of decoder 26 is TRUE when counter 25 has accumulated one clock pulse and is FALSE when any other number of clock pulses are accumulated in counter 25. Correspondingly, the signals on leads 010, 100 and 999 are TRUE if and only if corresponding numbers of clock pulses have been accumulated in counter 25. In other words, TRUE signals will appear momentarily on leads 001, 010, 100, and 999, respectively, as clock pulses 1, 10, 100, and 999 are accumulated in counter 25.

Leads 001, 010, and 100 serve as inputs to AND-GATES 37, 36, and 35, respectively. Lead L2 from level detector 18 is coupled as separate inputs to AND-GATES 35, 36, and 37. When the signal on lead L2 is FALSE as a result of input signal HV to level detector 18 being below 1.1 volts, none of AND-GATES 35, 36, and 37 can have TRUE outputs. However, when L2 becomes TRUE, a TRUE output can occur from gates 35, 36, and 37 if a TRUE signal occurs on one of the leads 001, 010, or 100.

The outputs from AND-GATES 35, 36, and 37 serve as inputs to OR-GATE 38. Lead 999 from decoder 26 serves directly as an input to OR-GATE 38, and a further input to OR-GATE 38 is reset lead RA. As is well known, OR-GATE 38 will have a TRUE output when any one of its inputs is TRUE and a FALSE output when all of its inputs are FALSE. The output of OR-GATE 38 is coupled to the SET(S) input of flip-flop 39. Flip-flop 39 will be changed from a RESET to a SET state when a TRUE output from OR-GATE 38 occurs. Flip-flop 39 will remain in the SET state until a TRUE signal occurs on reset input lead RB or RB'. When flip-flop 39 is in its RESET state, A1 is TRUE and A2 is FALSE. Correspondingly, when flip-flop 39 is in its SET state, A1 is FALSE and A2 is TRUE.

Leads 001, 010, 100, and 999 serve as individual inputs to OR-GATE 46 so that a TRUE signal exists at the output of OR-GATE 46 in response to a TRUE signal on one of its input leads. The output of OR-GATE 46 serves as an input to AND-GATE 47. AND-GATE 47 has a further input C1 which is derived from output lead A2 of flip-flop 39 by way of buffer amplifier 40, delay line 44, and inverting amplifier 45. C1 is TRUE when flip-flop 39 is in a RESET state and becomes FALSE a short time (about 5 microseconds) after flip-flop 39 is placed in a SET state by a TRUE output from OR-GATE 38. When C1 is TRUE, AND-GATE 47 will have a TRUE output each time a TRUE input from OR-GATE 46 is received as a result of a TRUE input on one of its input leads. The output of AND-GATE 47 is coupled by way of inverting amplifier 48 to an inhibit transfer input on bistable circuit element 49. Bistable circuit elements 49, 50, 51 are connected together in a counting register configuration. Each TRUE output signal from AND-GATE 47 will change the state of bistable element 49. Each time bistable element 49 changes from a SET to a RESET state, the state of bistable element 50 will be changed. Correspondingly, each time bistable element 50 changes from a SET to a RESET state, the state of bistable element 51 will be changed. Output H1 from bistable element 51 is fed back into a reset input R' of bistable element 49 so that, when bistable element 51 changes from a RESET to a SET state, bistable element 49 will thereby be placed in a SET state.

Assuming that all three bistable elements 49, 50, and 51 are initially in a RESET state as a result of a TRUE signal on reset lead RB or RB', a TRUE output from AND-GATE 47 will place bistable element 49 in a SET state. Outputs F1 and F2 of bistable element 49 become FALSE and TRUE, respectively. Output F2 is coupled to AND-GATE 53 and the other input to AND-GATE 53 is the G1 output from bistable element 50 which has a TRUE value at this time. Consequently, AND-GATE 53 has a TRUE output D1 which lights decimal point light 56. Decimal point light 57 is lit when a second TRUE output from AND-gate 47 is received since bistable element 49 is then in a RESET state and bistable element 50 is in a SET state so that the F1 output from bistable 49 and the G2 output from bistable 50 are TRUE inputs to AND-gate 54. When a third TRUE output from AND-gate 47 is received, bistable element 49 is SET and bistable element 50 remains in a set condition. The F2 and G2 outputs from bistable elements 49 and 50, respectively, are TRUE so the two inputs to AND-GATE 55 are true. Decimal point light 58 is lit since D3 is TRUE at this time. When a fourth TRUE output is received from AND-GATE 57, bistable elements 49 and 50 are both RESET, and the resetting of bistable element 50 sets bistable element 51. Lead H1 from bistable element 51 is fed back to the R' input of bistable element 49, placing bistable element 49 in a SET condition. Consequently, F2 from bistable element 49 and G1 from bistable element 50 are TRUE, and decimal point light 56 is again lit. Up until this time bistable element 51 has been in a reset state with H1 TRUE and H2 FALSE. When H1 is TRUE and H2 is FALSE, millicurie (MC) light 32 is lit. Correspondingly, when H1 is FALSE and H2 is TRUE, microcurie (MC) light 33 will be lit. The TRUE signal on I1 will occur when the output of inhibit amplifier 52 is TRUE or, in other words, when C1 is FALSE. C1 is FALSE a short time after flip-flop 39 is SET by a TRUE signal from OR-GATE 38. OPERATE light 31 will also be lit when I1 becomes FALSE.

The sequence of operation of the various circuit elements shown in FIG. 1 will become clear as a description of a typical operation is given below.

In FIG. 2, an automatic internal recycling and manual reset circuit is shown. A recycle timer 60 has an AND-GATE input 59 with two inputs labeled L1 and A2. Thus recycle timer 60 will be operated when inputs L1 and A2 are both TRUE and this will occur when flip-flop 39 is in a SET state and level detector 17 has a TRUE output due to the input signal HV being below 0.1 volt. The output J1 from recycle timer 60 serves as one of the inputs to OR-GATE 61, and OR-GATE 61 has its output coupled through a capacitor 63 to the SET input of a monostable multivibrator 64. The output 61 from recycle timer 60 is FALSE until a preselected time interval passes after inputs L1 and A2 both become TRUE. At this time, J1 becomes TRUE and monostable multivibrator 64 is SET by the TRUE pulse from OR-GATE 61 through capacitor 63. Correspondingly, a TRUE signal from manual reset circuit 62 into OR-GATE 61 is coupled through capacitor 63 to SET monostable 64. Monostable 64 in its SET state provides a TRUE output on output lead RA for a preselected interval and then automatically resets to provide a TRUE output signal coupled through capacitor 65 on output lead RB.

Output lead RA provides an input to OR-gate input 20 on capacitor reset circuit 21 and to OR-gate 38 in FIG. 1. Output lead RB serves as a RESET input to flip-flop 39, OR-gate 42, and bistable elements 49, 50, and 51 in FIG. 1. The operating sequence of the recycle and reset circuit shown in FIG. 2 will be described in conjunction with the description of the operation of circuits in FIG. 1 given below.

In FIG. 3 above-range and nonlinear ramp recycling circuitry which can be incorporated into the basic circuitry illustrated in FIG. 1 is shown. A level detector 66 receives the input signal HV and is set at a 10.1-volts threshold to provide a TRUE output signal on output lead L3 when the signal HV is at or above the 10.0-volt level. Output lead L3 serves as a SET input to a flip-flop 67 so that flip-flop 67 changes from a RESET to a SET state in response to a TRUE signal on L3. Output M2 from flip-flop 67 is FALSE until flip-flop 67 changes to a SET state when M2 becomes TRUE. M2 serves as an input to AND-GATE 68 and to AND-GATE 78 shown in FIG. 3 and also serves as an input to OR-GATE 38 in FIG. 1.

Flip-flop 72 is provided with a SET input by the output of AND-GATE 70 which has input leads 001 and C1. Flip-flop 72 has a RESET input provided by the output of OR-GATE 71 which has inputs RA and RB'. Consequently, flip-flop 72 is SET when the signals on leads 001 and C1 are both TRUE and is RESET each time a TRUE signal on RA or RB's occurs. In its SET state, flip-flop 72 provides a TRUE output on output lead N2 which serves as an input to AND-GATE 73. AND-GATE 73 has a third input lead labeled L1 which is the output from level detector 17 in FIG. 1. The output 01 from AND- GATE 68 is TRUE only when flip-flop 67 is in a SET state and when output N1 is TRUE, ABOVE RANGE light 69 is lit.

Output P1 from AND-GATE 73 is TRUE only when both flip-flops 67 and 72 are in a SET state, and the output L1 of level detector 17 is TRUE. When output P1 from AND-GATE 73 is TRUE, the output of OR-GATE 74 becomes TRUE and this output is coupled through a buffer amplifier 75 and a capacitor 76 to become a TRUE signal on lead RB'. OR-GATE 74 also has an input RB from monostable 64 in FIG. 2 so that a TRUE RB' RESET signal occurs each time a TRUE RB RESET signal occurs. The operational significance of the circuitry shown in FIG. 3 will be understood from a description of its operation in conjunction with the circuitry in FIGS. 1 and 2 given below.

In FIG. 4, range extending circuitry which can be used in conjunction with the circuitry shown in FIG. 1 is illustrated. Flip-flop 79 is provided with a SET input by the output of AND-GATE 78 which has three separate inputs, two of which are leads 999 and C1. The third input is from L2 through inhibit amplifier 77. Consequently, flip-flop 79 will be changed from a RESET to a SET state when TRUE signals on leads 999 and C1 coincide with a FALSE signal on lead L2. Output Q1 from flip-flop 79 which serves as an input to AND-GATE 83 is TRUE when flip-flop 79 is in a RESET state. Correspondingly, output Q2 from flip-flop 79 is TRUE when flip-flop 79 is in a SET state and serves as an input to AND-GATE 82.

An inhibit output from clock circuit 80 provides an inhibit input to a "divide-by-ten" circuit (10) 81 and also a second input to AND-GATE 82. The output of "divide-by-ten" circuit 81 provides a second input to AND-GATE 83. The outputs of AND-GATES 82 and 83 provide inputs to AND-GATE 84, and the output from AND-GATE 84 provides a CL' input to counter 25. The operation of this circuitry is such that when flip-flop 79 is in a RESET state, Q1 is TRUE and Q2 is FALSE so that the output of AND-GATE 82 is always TRUE and the output of AND-GATE 83 is TRUE except when a TRUE pulse is received from divide-by-ten circuit 81. This occurs after each of 10 clock pulses from clock circuit 80. Since the output of AND-GATE 83 changes from FALSE to TRUE after each 10 clock pulses, the output from AND-GATE 84 changes from TRUE to FALSE after each 10 clock pulses. Each FALSE output CL' from AND-GATE 84 produces one count in counter 25 because the inhibit input thereon.

However, when flip-flop 79 is in a SET state, Q2 is TRUE and Q1 is FALSE so that AND-GATE 83 always has a TRUE output and AND-GATE 82 has an output which changes from FALSE to TRUE with each clock pulse from clock circuit 80. The output CL' from AND-GATE 84 is thus clock pulses of a 10 times greater frequency than in the former case.

Output lead Q1 from flip-flop 79 also provides, through inhibit amplifier 85, a Q3 input to OR-GATE 86 and to the SET inputs of bistable circuit elements 50 and 51. The output of OR-GATE 86 serves as a RESET input to bistable element 49. The other input to OR-GATE 86 is either RB from FIG. 2 or RB' from FIG. 3 which also serves as an input to the RESET inputs of bistable elements 50 and 51. Consequently, when flip-flop 79 changes from a RESET to a SET state, Q1 becomes FALSE and Q3 becomes TRUE, placing bistable element 49 in a RESET state and bistable elements 50 and 51 in a SET state. In this condition, the outputs from bistable elements 49, 50, and 51 are decoded to provide a TRUE output signal D2 from AND-GATE 54 in FIG. 1 to light decimal point light 57. The significance of these operations will be seen from the description given below of the operation of the circuitry of FIG. 4 in combination of the circuitry of FIG. 1.

Now the operation of the circuitry shown in FIGS. 1 and 2 will be described in conjunction with reference to the pulse diagram shown in FIG. 5. As shown in FIG. 5, the analog signal HV is a linear voltage ramp representing a continually increasing voltage stored on storage capacitor 14 as a result of the linear voltage ramp output from electrometer 10 being gated through linear gate 11. Initially the signal is at 0 volts, and the flip-flop 39 is in a RESET condition so that its output A1 is TRUE and its output A2 is FALSE. Since its output A1 provides the inhibit input on linear gate 11, the signal from electrometer 10 is coupled into storage capacitor 14. It should be noted that bistable elements 49, 50 and 51 are also in a RESET condition, and counter 25 has no clock pulses accumulated in it. Clock circuit 24 is inhibited by the TRUE output L1 from level detector 17 so that no clock pulses are being produced.

As a signal HV attains a magnitude of 0.1 volts, the output L1 from level detector 17 becomes FALSE, and the inhibit signal to clock circuit 24 is removed. A short time later, the first clock pulse comes along and the signal on CL moves from TRUE to FALSE. Concurrently therewith a TRUE output signal appears on output lead 001 from decoder 26 indicating that a count of 001 has been accumulated in counter 25. In response to a TRUE signal on lead 001, a signal on lead E1 at the input to bistable circuit element 49 becomes FALSE setting bistable circuit element 49. Although it is not shown, the setting of bistable circuit element 49 causes decimal point light 56 to be illuminated because the output D1 from AND-GATE 53 becomes TRUE.

During the period of the first clock pulse, the signal HV reaches the 1.1-volt level so that the signal L2 becomes TRUE. A TRUE value of L2, therefore, coincides with a TRUE signal on the 001 lead at the inputs to AND-GATE 37, and the resulting TRUE output from AND-GATE 37 is coupled through OR-GATE 38 to SET flip-flop 39. The A1 and A2 outputs of flip-flop 39 become FALSE and TRUE, respectively. As the A1 becomes FALSE, linear gate 11 is inhibited and no further transfer of the signal from electrometer 10 to storage capacitor 14 takes place. Moreover, since A2 becomes TRUE, B2 also becomes TRUE and, accordingly, electrometer 10 is RESET and a short pulse on C2 RESETS counter 25 to zero.

Clock circuit 24, which previously had a TRUE signal on its D-input so that clock pulses of a U-periodicity were called for or programmed, now has a TRUE signal on its U-inhibit input so that clock pulses with a D-periodicity are programmed. Clock circuit 24 continues to produce clock pulses at this new periodicity since L1 is still FALSE. Since C1 became FALSE a short time after A2 became TRUE, the second TRUE signal on the output 001 from decoder 26 does not produce a FALSE signal on lead E1 at the input of bistable circuit element 49. Consequently, decimal point light 56 remains lit and does not change, even if further output pulses occur on any of the leads 010, 100, or 999 from decoder 26.

At the time that linear gate 11 is inhibited, constant current source 15 begins to discharge storage capacitor 14 at a preselected constant rate. During this discharging period, clock pulses CL are being accumulated in counter 25. This continues until the signal HV from storage capacitor 14 reaches the 0.1 -volts level, at which point L1 becomes TRUE and clock circuit 24 is inhibited. The number of clock pulses produced in the discharge or measuring interval is accumulated in counter 25 and decoder 26 decodes the number of accumulated pulses in counter 25 into appropriate units, tens and hundreds digits for display units, tens, and hundreds display lights 28, 29, and 30. It should be noted that when C1 became FALSE a short time after flip-flop 39 was SET, 11 became TRUE so that OPERATE light 31 was deenergized. Millicurie (MC) light 32 was also energized because bistable element 51 was in a SET state with a FALSE output on output lead H2.

Referring now to FIG. 2, since flip-flop 39 is in a SET state with output A2 TRUE and since L1 has become TRUE, AND-GATE 59 turns on recycle timer 60. After a preselected time interval, J1 becomes TRUE and a short time later a RESET pulse RB is produced by monostable multivibrator 64. RESET pulse RB resets flip-flop 39 and bistable circuit elements 49, 50 and 51 as well as counter 25. Consequently, all of the display lights on display means 27 are extinguished and the equipment is ready to make another measurement since linear gate 11 is no longer inhibited and the electrometer has been reset. It should be noted that, when L1 became TRUE, capacitor RESET circuit 21 operated to discharge storage capacitor 14 to a slightly negative voltage. Although not shown, the signal HV would reoccur when flip-flop 39 is RESET and another measurement would be made.

In the particular embodiment of the circuit of this invention shown in FIG. 1, the difference in threshold voltages between level detector 17 and level detector 18 is chosen to be 1.0 volt. The periodicity of the U-programmed clock pulses must be preselected in accordance with the magnitude of this threshold voltage difference so that the pulses produced on output leads 001, 010, 100, and 999 from decoder 26 occur at appropriate times while the signal HV Is ranging between 0.1 volts and 1.1 volts or higher such that the number of such pulses creates proper decimal point and ranging information for display on display means 27. What this means is that the periodicity of clock pulses during the ranging interval when linear gate 11 is not inhibited and a signal is being stored on storage capacitor 14 must be selected in terms of the difference in level-detecting thresholds and in terms of the functional relationship between the slope of the linear voltage ramp from electrometer 10 and the magnitude of the radiation being measured. For example, if the system is to be used to measure an aliquot of a particular radioactive isotope in curie units, a particular functional relationship will exist between the slope of the linear ramp signal from electrometer 10 and the activity of the particular aliquot of radioactive isotope, and this function must be predetermined so that the periodicity of the clock pulses from clock circuit 24 can be properly selected to enable the system to provide accurate ranging information. More specifically, with a 1-volt difference between the level detectors 17 and 18, the periodicity of clock pulses from clock circuit 25 during the ranging period must be selected such that, if the linear voltage ramp from electrometer 10 ranges precisely between 0.1 and 1.1 volts prior to the first clock pulses, the radiation being measured is precisely 10.0 millicuries. This is the case with respect to the example given in the description of the circuitry of FIG. 1 in connection with FIG. 5. Alternatively, if precisely 10 clock pulses occur while the signal HV is ranging between 0.1 and 1.1 volts, this would produce a reading of 1.00 millicuries. Again if precisely 100 clock pulses occur while the signal HV is ranging between 0.1 volts and 1.1 volts, the 0.100 millicuries will be indicated. Finally, if precisely 999 clock pulses are produced while the signal is ranging between 0.1 volts and 1.1 volts, the radiation value of 10.0 microcuries is displayed.

From this, it is apparent that the system shown in FIG. 1 must be calibrated for each particular radioactive isotope to be measured by programming clock circuit 24 to produce clock pulses of a proper periodicity with respect to the difference in thresholds between level detectors 17 and 18 and with respect to the known functional relationship existing between slope magnitude of the signal HV and the magnitude of the radiation value in curie units. It should be noted that there are three variables that can be manipulated in the system when calibrating for a particular radioactive isotope, namely, the difference between the thresholds of the first and second level detectors 17 and 18, the periodicity of the clock pulses from clock circuit 24 during the ranging or U-mode, and finally the ranging pulses decoded by decoder 26 from counter 25.

During the measuring interval clock circuit 24 is programmed by a TRUE A2 signal from flip-flop 39 to produce clock pulses having a D-periodicity. This D-periodicity must be chosen with respect to the discharge rate of storage capacitor 14 produced by constant current source 14 and with respect to the difference in thresholds between level detectors 17 and 18. Specifically, 100 clock pulses with D-periodicity must occur while constant current source 15 is discharging storage capacitor 14 from 1.1 volt to 0.1 volt.

It should be understood that measurements with fewer or greater number of digits than the three illustrated could be provided for within the general framework of the circuitry of this invention. It should also be clear at this point that the type of measurement being made and the particular units of measurement involved are not limited to the example or examples given since the system can be calibrated to give a direct digital readout with appropriate decimal period and range information of any measured quantity by substituting for electrometer 10 an appropriate transducer arrangement to provide a linear voltage ramp having a slope magnitude which is a predetermined linear function of the physical quantity being measured.

From the description of the operation of the circuitry in FIG. 1 with respect to the diagram in FIG. 5, it should be readily apparent how voltage ramps of different magnitude will be measured by the equipment. For instance, suppose the signal HV had attained a magnitude of 5 volts prior to the occurrence of the first clock pulse. In such a case, the number of measuring pulses produced would be 500 instead of 100, and this would signify a radiation value of 50.0 millicuries to be displayed by display means 27.

Suppose, however, that the signal HV reaches 1.1 volts somewhere between the first and the 10 clock pulses so that flip-flop 39 is SET when the 10 clock pulse occurs because the two inputs to AND-GATE 36 is TRUE. In this case, two E1 pulses would have occurred, and decimal point light 57 would be lit since bistable circuit element 49 would be in a RESET condition and bistable circuit element 50 would be in a SET condition producing a TRUE output from AND-GATE 54. The magnitude of radiation displayed by display means would be somewhere between 1.00 millicuries and 9.99 millicuries depending on the total magnitude of voltage stored on storage capacitor 14 prior to the setting of flip-flop 39 and the inhibiting of linear gate 11.

If the slope of this voltage ramp from electrometer 10 is so small that the 1.1-volt level is reached after 100 clock pulses but before 999 clock pulses have occurred during the ranging interval, the TRUE signal on lead 999 that occurs at the time of the time of clock pulse 999 is coupled through OR-GATE 22 to inhibit clock 24 and is coupled directly to OR-GATE 38 to SET flip-flop 39. With four E1 pulses occurring in the input of bistable element 49 and as a result of the interconnection of inputs and outputs of the three bistable elements 49, 50, and 51, these elements will be in the SET, RESET, and SET states, respectively. With bistable element 51 in the SET state, a FALSE signal H1 lights microcurie (MC) light 33 as soon as 11 becomes TRUE after flip-flop 39 is SET. Moreover, decimal point light 56 is energized and, depending on the number of measuring pulses produced during the measuring period, a radiation value between 10.0 and 99.9 microcuries will be displayed by display means 27.

If the slope of the output voltage range from electrometer 10 is so small that the 1.1 level has not been reached at the time the fourth ranging pulse 999 occurs, less than 100 measuring pulses will be produced during the measuring period and the radiation value is between 00.1 and 09.9 microcuries. By employing the circuitry shown in FIG. 4 in conjunction with the circuitry shown in FIG. 1, the apparatus of this invention will have its range extended so that radiation values down to 0.01 microcuries can be measured. This is accomplished by the apparatus shown in FIG. 4 by increasing the frequency of measuring pulses tenfold and, correspondingly, fixing the states of bistable circuit elements 49, 50, and 51 so that decimal point light 57 and microcurie light 33 will be energized.

In FIG. 6, the operation of the combined circuitry of FIGS. 1 and 4 is illustrated. As shown in FIG. 6, the signal HV has risen to the 0.45-volt level at the time that clock pulse 999 during the ranging interval occurs. As described above, clock pulse 999, which is the same as the fourth ranging pulse on lead 999 from detector 26, sets flip-flop 39 directly through OR-GATE 39. Accordingly, counter 25 is RESET to 0. With the circuitry shown in FIG. 1 unmodified by the circuitry shown in FIG. 4, only 35 measuring clock pulses would be produced during the measuring interval while constant current source 15 is discharging storage capacitor 14 back down to the 0.1-volt level. These 35 pulses correspond to a radiation value of 03.5 microcuries displayed on display means 27. However, with the circuitry of FIG. 1 modified as shown in FIG. 4, the arrival of ranging pulse 999 coincides with a TRUE value on C1 because flip-flop 39 has been in a RESET condition and a FALSE value on lead L2 because the 1.1-volt level has not been reached. The output of AND-GATE 78 becomes TRUE and flip-flop 79 is SET. As previously described with reference to FIG. 4, the setting of flip-flop 79 causes each clock pulse from clock circuit 80 to produce a corresponding pulse on lead CL' at the input to counter 25. Prior to the setting of flip-flop 79, a clock pulse would appear on lead CL' after only 10 clock pulses have been produced by clock circuit 80. Thus, the setting of flip-flop 79 increases the frequency of clock pulses entered into counter 25 by a factor of 10. Moreover, when flip-flop 79 is SET, its output Q1 becomes FALSE and the output Q3 places bistable circuit elements 49, 50, and 51 in such states that decimal point light 57 is energized and microcurie light 33 is also energized. As a result of the tenfold increase in the frequency of measuring pulses, 350 such pulses will now be accumulated in counter 25 while signal HV is declining from 0.45 volts to 0.1 volt during the measuring interval. These 350 clock pulses accumulated in counter 25 are then decoded by decoder 26 so that a value of radiation of 3.50 microcuries is displayed by display means 27. This corresponds identically to the 03.5 microcuries which would be displayed by FIG. 1 circuitry without the FIG. 4 modification.

However, with the FIG. 4 modification, accuracy of measurement has been increased by a factor of 10 for low values of radiation and, correspondingly, the range of the apparatus has been increased at the lower end by a factor of 10.

The circuitry shown in FIG. 3 can be employed in conjunction with the circuitry shown in FIG. 1 to enable the apparatus to handle very high levels of radiation which would produce an output voltage ramp from electrometer 10 of a slope such that the 10.1-volt level is reached prior to the occurrence of the first ranging pulse 001. For such high values of radiation, the apparatus shown in FIG. 1 by itself would provide a reading of 99.9 millicuries when, in fact, the value of the radiation is greater than this value. The apparatus shown in FIG. 3 enables an indication that the radiation level being measured is above the range of the apparatus.

Figure 7:
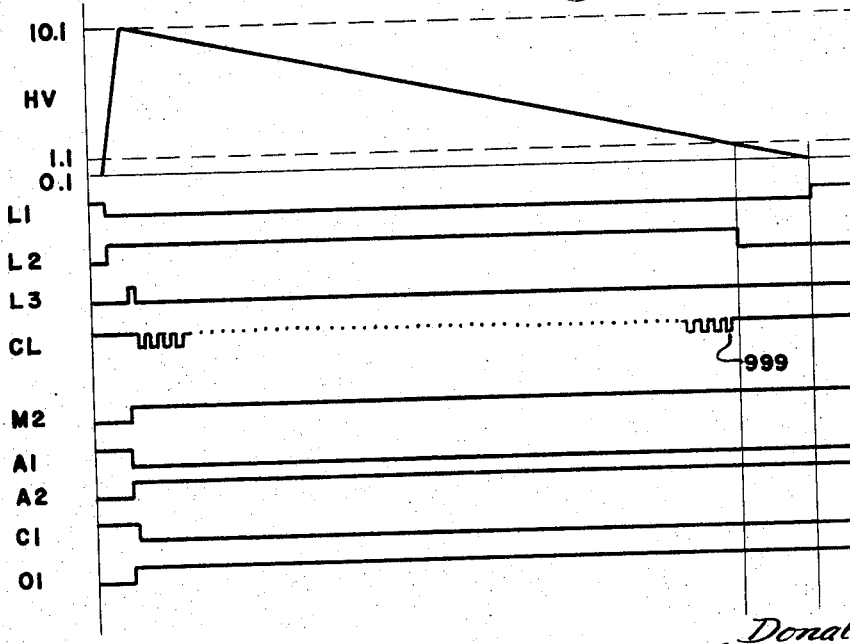

In FIG. 7, the operation of FIG. 3 is illustrated. When the signal HV reaches the 10.1-volt level, the TRUE output signal on lead L3 from level detector 66 sets flip-flop 67. Output M2 from flip-flop 67 becomes TRUE, and this TRUE Signal is coupled through OR-GATE 38 in FIG. 1 to SET flip-flop 39. All of this occurs prior to the first clock pulse from clock circuit 24 during the ranging interval. Since the first clock pulse from clock circuit 24 has not yet occurred, the signal on output lead 001 from decoder 26 is FALSE and flip-flop 72 is in a RESET state. Consequently, output N1 from flip-flop 72 is TRUE and both inputs to AND-GATE 68 are TRUE. Output 01 from AND-GATE 68 is thus TRUE and ABOVE RANGE light 69 will be energized.

Measuring pulses will then be entered into counter 25, and 999 of such will accumulate. Display means 27 will display 999 millicuries with no decimal point light, but the ABOVE RANGE light which is energized will indicate that no proper measurement has been made.

FIG. 3 also incorporates a further feature to enable the apparatus to handle the circumstance in which a nonlinear voltage ramp from electrometer 10 is incurred such that the 10.1-volt level is reached after the first ranging pulse 001 occurs. Flip-flop 72 is always SET by the occurrence of the first ranging pulse 001 and the input to AND-GATE 70. This occurs because C1 is also TRUE when the first range pulse 001 occurs. With flip-flop 72 in a SET state, output N1 becomes FALSE and its output N2 becomes TRUE. If during the ranging interval the signal HV should at any time reach the 10.1-volt level and trigger level detector 66 to SET flip-flop 67, the signal on lead M2 at the output of flip-flop 67 becomes TRUE. Flip-flops 39 is SET by the TRUE signal on M2 being coupled through OR-GATE 38 so that the measuring interval immediately begins. Nine-hundred and ninety-nine measuring pulses will be accumulated in counter 25, and this will be displayed as 99.9 millicuries by display means 27 but no ABOVE RANGE indicated will be given since output lead N1 from flip-flop 72 is FALSE. However, when the signal on output lead L1 from level detector 17 becomes TRUE at the end of the measuring interval, all of the inputs to the AND-GATE 73 are TRUE, and a TRUE signal appears on its output lead P1. This TRUE signal on P1 is coupled through OR-GATE 74 and buffer amplifier 75 to produce a RESET pulse RB' through capacitor 76. The RESET pulse RB' will RESET all the flip-flops and other bistable circuit elements and, consequently, the apparatus will recycle to attempt another measurement of the radiation level.

The condition of a nonlinear voltage ramp might occur if a large source of radiation is brought into the vicinity of the electrometer ionization chamber combination after the ranging interval has been initiated by the accumulation of a 0.1-volt level on storage capacitor 14. In such case, the apparatus will be SET by the circuitry shown in FIG. 3, and a proper measurement of the radiation from the new source may be made if its radiation level is not above the range of the apparatus.

It should be understood that the overall range of the circuitry shown in FIG. 1 is limited by the capacity of the counter 25 and the number of decimal integers that can be displayed by display means 27. From the description above, it should be noted that one skilled in the art could contract or expand the range of the apparatus described. It should also be apparent to those skilled in the art that, by providing for a variable periodicity of clock pulses from clock circuit 24 during the ranging interval, the apparatus can be calibrated to perform measurements in corresponding units on a variety of radioisotopes. It should be understood also that the apparatus is not limited to measurements of radiation in curie units; but by making appropriate changes measurements in any other radiation unit can be accomplished. Finally it should be understood that measurements other than radiation measurements are also within the scope of this invention since the apparatus shown in FIG. 1 can be calibrated to read out in direct decimal form the measurements of any physical quantity which can be transduced into a linear voltage ramp having a slope magnitude proportional in accordance with a predetermined function to the magnitude of the physical quantity. This invention is accordingly not limited to the specific embodiments described above since numerous changes can be made without departing from the scope of the invention as claimed in the following claims.

I claim:

1. Apparatus for measuring a physical quantity and providing a decimal digital display of said measured quantity comprising:

transducer means for converting said physical quantity into an analog signal having a substantially constant slope of a magnitude which varies directly with the magnitude of said physical quantity in accordance with a predetermined function; and means for translating said analog signal into displayed decimal numbers, decimal point location, and other range information representing said magnitude comprising:

means operative during a range finding period for storing a differential level of said analog signal proportional to said magnitude and simultaneously producing and registering a particular number of ranging pulses indicative of the decimal range of magnitudes in which said slope of said analog signal lies;

means operative during a subsequent measuring period for producing and registering a number of measuring pulses proportional to said stored differential level of said analog signal such that said number of registered measuring pulses comprises said measured quantity in decimal digital form; and means for producing a decimal number display of said number of measuring pulses and a decimal point display located in accordance with said number of ranging pulses.

2. Apparatus for measuring a physical quantity and providing a decimal digital display of said measured quantity comprising:

transducer means for converting said physical quantity into a linear analog signal having a substantially constant slope of a magnitude which varies directly with the magnitude of said physical quantity in accordance with a predetermined function;

storing means for storing said analog signal;

inhibitable gating means for gating said analog signal into said storing means;

discharging means for discharging said stored analog signal from said storing means at a preselected constant rate when said gating means is inhibited;

first and second sensing means operative to sense the level of said stored analog signal and to supply first and second level signals, respectively, having first values when said stored analog signal is below preselected first and second levels, respectively, and second values when said stored analog signal is at or above said first and second levels, respectively;

programmable pulsing means operative in response to a first level signal of a second value to produce periodic pulses having one of first and second periodicities;

resettable register means for accumulating said periodic pulses from said pulsing means;

decoding means for translating said accumulated periodic pulses into displayed decimal digits corresponding to the sum of said accumulated pulses and for providing output pulses as preselected sums of accumulated pulses occur;

coincidence means for signaling the coincidence of one of said output pulses with a second level signal of a second value;

inhibitable ranging means for accumulating said output pulses and for translating the sum of said accumulated output pulses into display range information;

control circuit means responsive to said coincidence signal to change from a first stable state to a second stable state and being operative in said first stable state to program said programmable pulsing means to produce periodic pulses having said first periodicity, being operative in changing from said first stable state to said second stable state to reset said resettable register means, and being operative in said second state to inhibit said inhibitable gating means and said inhibitable ranging means and to program said programmable pulsing means to produce periodic pulses having said second periodicity.

3. Apparatus for converting an analog signal having a substantially constant slope of a magnitude which varies directly with the magnitude of a measured quantity in accordance with a predetermined function into a decimal digital display of said measured quantity comprising:

storing means for storing said analog signal;

gating means for gating said analog signal into said storing means;

first and second sensing means operative to sense the level of said stored analog signal and to supply first and second level signals, respectively, having first values when said stored analog signal is below preselected first and second levels, respectively, and second values when said stored analog signal is at or above said first and second levels, respectively;

ranging pulse means operative in response to a change in said first level signal from said first to said second value to produce a ranging pulse at ranging intervals which are predetermined in accordance with said predetermined function and the difference between said first and second levels;

coincidence circuit means for producing a coincidence signal when one of said ranging pulses coincides with said second level signal having a second value;

first inhibit means operative in response to said coincidence signal to inhibit said gating means and said range pulsing means so that a particular level of said analog signal is stored by said storing means;

discharging means operative in response to the inhibiting of said gating means to discharge said stored analog signal at a preselected constant rate;

measuring pulse means operative in response to said coincidence signal to produce periodic measuring pulses having a periodicity which is preselected in accordance with said preselected constant rate of discharge;

second inhibit means operative in response to a change in said first level signal from said second to said first value to inhibit said measuring pulse means;

means for counting said ranging pulses and for translating said count into displayed range information, and means for counting said measuring pulses and for displaying the sum thereof in digital form.

4. Apparatus as claimed in claim 3, further comprising third sensing means operative to sense the level of said stored analog signal and to supply a third level signal having a first value when said stored analog signal is below a preselected third level, said third level being greater the highest measurable level of said stored analog signal; and circuit means operative in response to a change in said third level signal from said first to said second value to provide an above range signal to said coincidence circuit means; said coincidence circuit means producing a coincidence signal in response thereto.

5. Apparatus as claimed in claim 3, wherein said range-pulsing means comprises a source of periodic pulses having a periodicity predetermined in accordance with said predetermined function and the difference between said first and second levels;

a binary register for accumulating said periodic pulses; and decoding means for supplying output pulses when preselected numbers of said periodic pulses are accumulated in said binary register.

6. Apparatus as claimed in claim 5, wherein said source of periodic pulses comprises a clock circuit programmable to supply clock pulses with preselected periodicity; and measuring pulse means includes said clock circuit; and said means for counting said measuring pulses includes said binary register.

7. Apparatus as claimed in claim 3, wherein said analog signal is a voltage signal; said storing means is a storage capacitor; said gating means is a linear gating circuit coupling said voltage signal into said storage capacitor; said first and second sensing means are first and second voltage level detectors coupled to said storage capacitor, said first and second level signals being TRUE when said stored voltage signal is below preselected first and second voltage levels, respectively, and being FALSE when said towered voltage signal is at or above said first and second levels, respectively; said preselected first voltage level being sufficiently greater than a zero level to eliminate substantially the effects of noise on said apparatus.

8. Apparatus as claimed in claim 7, wherein said discharging means is a constant current source connected to said storage capacitor; and said ranging pulse means, said measuring pulse means, and said means for counting said measuring pulses together comprise:

a clock circuit programmable to produce periodic pulses with preselected first and second periodicity and having an input coupled to said first voltage level detector so that said periodic pulses are produced only when said first level signal is FALSE:

a binary register coupled to said clock circuit to accumulate said periodic pulses and having a reset input; and a decoding circuit coupled to said binary register to convert said accumulated periodic pulses to a decimal count and to decode an output pulse at preselected individual decimal count magnitudes;

said clock circuit, said binary register, and said decoding circuit functioning as said ranging pulse means when said clock circuit is programmed to produce periodic pulses with preselected second periodicity so that said periodic pulses are said measuring pulses.

9. Apparatus as claimed in claim 8, wherein said decimal digital display comprises $n$ decimal digits; said decoding circuit decodes said output pulses at decimal count magnitudes corresponding to decimal numbers $10^i$, where $i=0, 1, -n-1$, and decimal number $10^n-1$; said first periodicity being preselected in accordance with the difference in magnitude between said first and second voltage levels and said predetermined function such that said output pulses define $n+1$ measurable ranges of said measured quantity.

10. Apparatus for converting an analog signal having a substantially constant slope of a magnitude which varies directly with the magnitude of a measured quantity into a decimal digital display of said measured quantity comprising:

means for defining a plurality of ranging intervals of ascending decimal orders of magnitude;

means for accumulating a differential level of said analog signal proportional to said magnitude during one or more of said ranging intervals;

means for producing and registering a number of measuring pulses proportional to said stored differential level such that said number of registered pulses comprises said measured quantity in decimal digital form; and means for producing a decimal number display of said number of measuring pulses and a decimal point display located in accordance with the number of ranging intervals during which said analog signal is accumulated.

* * * * *